United States Patent [19]

Maryatt

[11] Patent Number: 4,679,105
[45] Date of Patent: Jul. 7, 1987

[54] HEAD POSITIONING ASSEMBLY FOR A DISK DRIVE

[76] Inventor: Christopher J. Maryatt, 175 Calvert Dr. No. N-203, Cupertino, Calif. 95014

[21] Appl. No.: 695,084

[22] Filed: Jan. 25, 1985

[51] Int. Cl.$^4$ .............................................. G11B 5/012
[52] U.S. Cl. ...................................... 360/97; 360/137
[58] Field of Search .................................. 360/97–99, 360/104, 105, 133, 137; 369/111

[56] References Cited

U.S. PATENT DOCUMENTS 4,318,144  3/1982  Galvagni ......................... 360/133 X
4,423,449  12/1983  Hasegawa ....................... 360/105 X Primary Examiner—John H. Wolff
Attorney, Agent, or Firm—Michael J. Hughes

[57] ABSTRACT

The invention is a head positioning assembly (10) for use with a conventional disk drive (12). The assembly (10) is adapted to position the ready/write head (22) on a rotating diskette (21) and includes a locating disk (30) provided with a cardioid cam groove (32). A cam follower (46) rides within the cam groove (32) and thereby causes a carriage (40) to move radially between a pair of guide rods (42 and 44) to position the read/write head (22). The locating disk (30) is caused to rotate by selectively activating a solenoid (98) which causes an idler assembly (72) to contact the locating disk (32) with a moving idler belt (90). The idler belt (90) is indirectly powered by the same brushless DC motor (16) which powers the disk drive (12). A sensing subassembly (50) senses a zero position aperture (34) and a plurality of tract position apertures (36) and acts in conjunction with external circuitry (600) and the solenoid (98) to control the rotation of the locating disk (30). When no rotation is desired the locating disk (30) is restrained by a brake pin (84) engaging one of a series of brake detents (39). The predominant usage of the present invention is in magnetic disk drives in the data processing industry.

36 Claims, 6 Drawing Figures

HEAD POSITIONING ASSEMBLY FOR A DISK DRIVE

TECHNICAL FIELD

The present invention relates generally to positioning devices and more particularly to devices and assemblies for linear positioning of a point on a rotating disk. The predominant current usage of the head positioning assembly of the present invention is in connection with magnetic media disk drives used in the data processing industry.

BACKGROUND ART

It is frequently important in modern day technology to precisely position an element at a selected radial location on a rotating platter, disk or similar elements. Some applications which require this sort of positioning are in the entertainment industry and include record turntables, compact disk players and video disk players. Each of these applications utilizes a head which moves on a single continuous spiral track. Various devices such as tracking tone arms and the like have been created to achieve accurate and steady positioning.

The data processing industry utilizes as data storage media a number of devices including rotating disk-like structures having magnetic media coated thereon. These sorts of devices include floppy disks which are packaged in diametrical various sizes ranging from 8.8 cm (3½ in.) to 13.2 cm (5¼ in.) to 20.1 cm (8 in.) and fixed disks (also known as "hard disks" or "Winchesters") which include rigid rotating disks of various data capacities, stacking numbers and physical sizes. These devices are invaluable for use in the small computer industry as they provide reliable means of data storage and retrieval and rapid techniques for transferring data to and from such storage.

Data is stored on a magnetic media disk on a series of concentric rings formed on the surface of the disk. These rings are known as tracks in floppy terminology or cylinders in Winchester terminology. Each track or cylinder is characterized in that each point on a given track or cylinder has the same radius from the origin or center point of the disk as each other point. The tracks are situated on the disk according to various densities, with one of the most common being 48 tpi (meaning "tracks per inch") radial separation. Depending on the size of the disk and the quality of the magnetic media a different number of tracks may be put on any given disk. The capacity of the disk per data storage is directly dependent upon the number of tracks and the density with which data can be written on those tracks.

Each disk may be dual sided and multiple disks may be present in the same storage device, however, each disk side, during operation, operates within a plane. Therefore the motion and positioning of a given point on the surface of such a disk may be stated in terms of a two dimensional coordinate system. In this instance, it is found that the rotational coordinate system ($r$=radius and $\phi$=angle of rotation) is far superior to the Cartesian system. In the rotational coordinate system each track upon a disk may be described as having a given value for $r$ while any point on that track may be accessed by a given value of $\phi$. Conventional usage has established that the tracks are numbered from the most exterior track on the disk to the interior. Therefore for a 60 track disk (in decimal notation), track 0 will be the closest usable track to the perimeter to the disk while track 59 is the closest usable track to the hub of the disk. Typically, only a partial band of the disk surface is actually utilized for data storage. In usage, the disk typically is in continuous rotation and the $\phi$ component may be determined by reading magnetically coded signals on each of the tracks or by sector defining apertures in the disk itself. The positioning of the read/write head of the apparatus, however, requires moving the head along a given fixed radius for various incremental r values. Ordinarily, the read/write head will move only along a linear track between the origin point of the disk and a fixed (non-rotating) point located outside the disk. In order to accurately read the given tracks on the disk it is necessary to move the read/write head in quantum units or increments with each incremental unit equal to the separation distance of the tracks. For a 48 tpi arrangement the increment between tracks will be 0.052 cm (1/48 in.). It is with this linear incremental positioning that the assembly of the present invention deals.

Various methods have been utilized in the prior art to position the read/write head. These have included lead screws, capstan actuated band drives and other methods of stepper motor actuation. Each of these methods has been successful in positioning the head over the center of the track, with varying degrees of accuracy and speeds of transition.

As with all technology, however, there remains room for improvement in the areas of positioning speed, positioning accuracy, simplicity of operation, reliability, durability, noninterference with other elements within the device, compact size and economy of manufacture. In a highly competitive technology all of the above factors are important targets for improvement, with the latter, economy of manufacture, being perhaps the most important.

DISCLOSURE OF INVENTION

Accordingly, it is an object of the present invention to provide a head positioning assembly which may be economically manufactured with no detriment to other performance characteristics.

It is another object of the present invention to provide a head positioning assembly which may operate from the same rotational motive source as the disk drive.

It is a further object of the invention to provide a precise physical/mechanical track locating analog, independent of magnetic signals.

It is another object of the invention to provide a head positioning assembly which is adaptable for use with any size or track density of disk.

It is a still further object of the present invention to provide an assembly which is extremely durable and has a long usable lifetime.

This invention relates to any application wherein it is necessary to precisely radially locate a point on a rotating medium and is specifically adapted for use with disk drives such as those utilized in the data processing industry. It is adapted to operate equally effectively with rigid or floppy diskettes, single sided or double sided, single disk per spindle or multiple disk per spindle and with disks of any radial size.

Briefly, a preferred embodiment of the present invention is a head positioning assembly which is adapted to mount within the disk drive assembly and is utilized to precisely radially position the read/write head on the disk.

One primary component of the head positioning assembly is a locating disk which is bearing mounted on the drive shaft of the disk drive in such a manner that it is concentric with the drive shaft but does not rotate therewith. The locating disk is provided with a cardioid groove, also known as a cam, formed on one surface of the disk. A cam follower, mounted on the read/write head carriage, rides within the cam groove. The read/write head carriage is slidably mounted in such a manner that its motion is restricted to a linear (+r and −r) motion with respect to the disk. A rotation of the locating disk, therefore, causes the cam and the cam follower to move the read/write head carriage in a positive or negative radial direction depending on the particular position of the cardioid (cam) groove. A series of apertures are formed about the circumference of the locating disk and are utilized for identifying discrete track positions. These include a track position aperture for each track which the positioning assembly is adapted to locate and a single zeroposition aperture to establish the reference radial point (selected to be the position that results in track 0).

Motion is induced in the locating disk and consequently in the read/write carriage by the rotational action of a pulley which is directly attached to the drive shaft and a belt mechanism which attaches the drive pulley to an idler/brake subassembly. The idler subassembly is selected to be a pivoting assembly which has two extreme positions. In the default mode, the subassembly applies a brake to the locating disk such that it does not rotate, while in operational or drive mode the assembly provides a beltwise contact to the locating disk which imparts the rotational motion from the drive pulley in such a manner that the locating disk is urged to rotate. A spring or tension mechanism constantly urges the assembly into the default mode while an electronically actuated solenoid may be activated to cause a switch in modes and bring the idler assembly into drive mode.

A pair of sensing and counting elements are situated about the periphery of the locating disk and are utilized to count apertures and therefore establish for the associated electronics the precise position of the read/write head with respect to the desired track number. In the preferred embodiment these sensing mechanisms are photoelectric.

External power sources and control circuitry are accessed for four elements of the assembly. Of these, the rotational power source for the disk drive brushless DC motor and the read/write signals to the read/write head are part of the drive itself and are independent of the head positioning assembly. However, the processing circuitry associated with the position sensing elements and the actuating circuitry for the solenoid are integral to the invention. The precise type of circuitry utilized for these purposes is not critical and may be selected from many of a number of well known methods. As long as some form of counting and processing circuitry is involved, the device will function properly.

It is an advantage of the present invention that a specific physical analog exists for each track on the data disk, thus making precise read/write head positioning readily achievable.

Another advantage of the present invention is that only a single motor is required to both spin the data disk and to position the read/write head.

A further advantage of the present invention is that the head positioning mechanisms can be easily situated within the space requirements of a conventional disk drive enclosure.

Still another advantage of the present invention is that it repositions the read/write head extremely rapidly and accurately. A still further advantage of the present invention is that, during the read/write portion of operation, the radial head position is fixed and held in place by the brake mechanism.

Another advantage of the present invention is that all elements having critical tolerances for proper functioning are tied to the central drive shaft of the disk drive and are thus more readily set and adjusted to close tolerances.

A further advantage of the invention is that all of the plastic assembly elements are constructed of the same materials with the same thermal expansion characteristics such that there is no loss of accuracy upon temperature changes.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST OF MODE OF CARRYING OUT INVENTION

Figure 1:
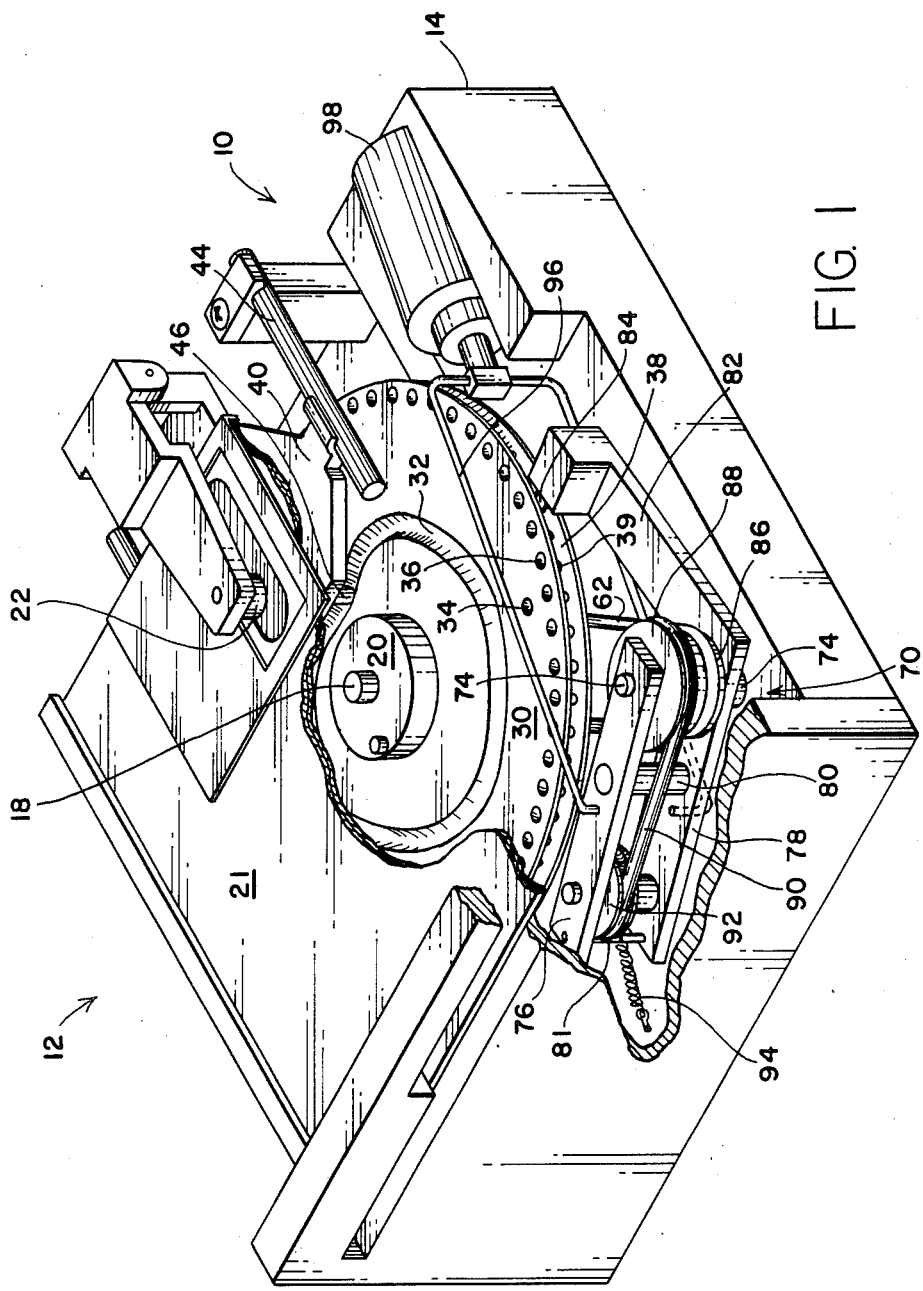
FIG. 1 is a perspective view of the operational elements of a disk drive mechanism including the head positioning assembly of the present invention.

The present invention is a head positioning assembly for precisely locating a point in a radial direction (+r and −r) on a rotating medium. The head positioning assembly is particularly adapted for use with disk drives used with magnetic storage media in the data processing industry. The immediately preferred embodiment is adapted for use with 8.8 cm (3½ in.) micro floppy disks such as those utilized in Hewlett-Packard and Macintosh computers.

The head positioning assembly adapted for disk drives, according to the preferred embodiment of the present invention, is illustrated in the several figures of the drawing and is designated therein by the general reference character 10. As is particularly seen in FIGS. 1–4, the head positioning assembly 10 is adapted for use with an otherwise conventional disk drive assembly 12. The conventional elements of the disk drive assembly 12 include an exterior case 14, which provides support for each of the other elements, a brushless DC motor 16 and a drive shaft 18 which provides rotational motion to a diskette hub 20 on which a diskette 21 is rotated. The diskette 21 is a flexible disk which is coated on both sides with a magnetic medium which may be encoded to carry data and messages. In the micro diskette situation the diskette 21 is enclosed in a rigid jacket while a flexible jacket is used with larger floppy diskettes. The diskette 21 is, during use, spun continually about the axis of the drive shaft 18 by the rotational motion provided by the brushless DC motor 16.

The data encoded on the magnetic medium of the diskette 21 is both written thereon and read therefrom by a read/write head 22. In order to achieve proper reading and writing of data to and from the diskette 21 it is imperative that the read/write head 22 be precisely radially positioned such that it can read, or write on, each of the specific tracks which are formed on the diskette 21.

Since the preferred embodiment is adapted for use with micro diskettes 21, and since this size of diskettes comes enclosed in rigid jackets, it is also necessary that the disk drive assembly 12 include a disk locking and eject mechanism (not shown). This type of mechanism is peculiar to certain varieties of disk drives and will not be utilized in others.

The preferred embodiment of the head positioning assembly 10 is adapted for utilization with a disk drive assembly 12 including the above described prior art elements. The head positioning assembly 10 includes several subassemblies which have specific purposes in its operation. These subassemblies include a locating disk subassembly which is designated by the references characters from 30 to 39, a read/write head carrying subassembly designated by the references numbers 40 to 49, a position sensing subassembly designated by the reference characters 50 to 59, a drive shaft rotation capture subassembly designated by the reference characters 60 through 69 and an idler/brake/solenoid assembly designated by the reference characters 70 through 99.

Figure 2:
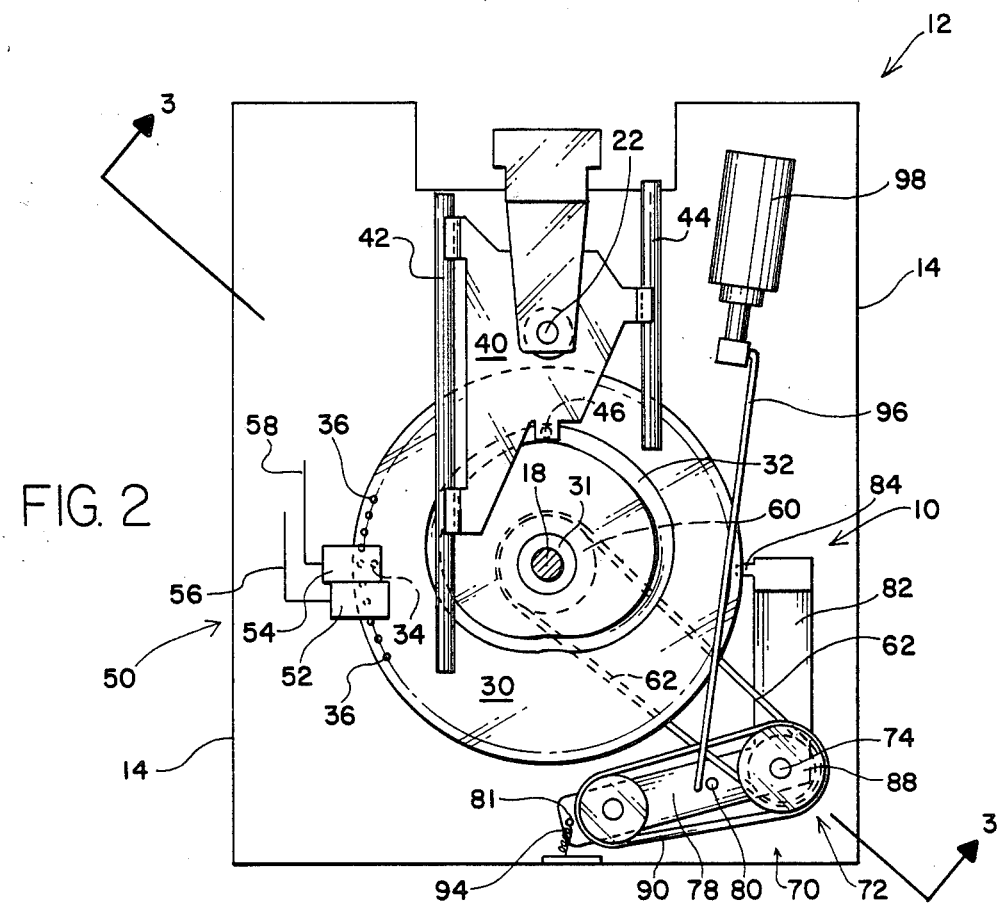
FIG. 2 is a top plan view of the operational elements of the head positioning assembly.
Figure 4:
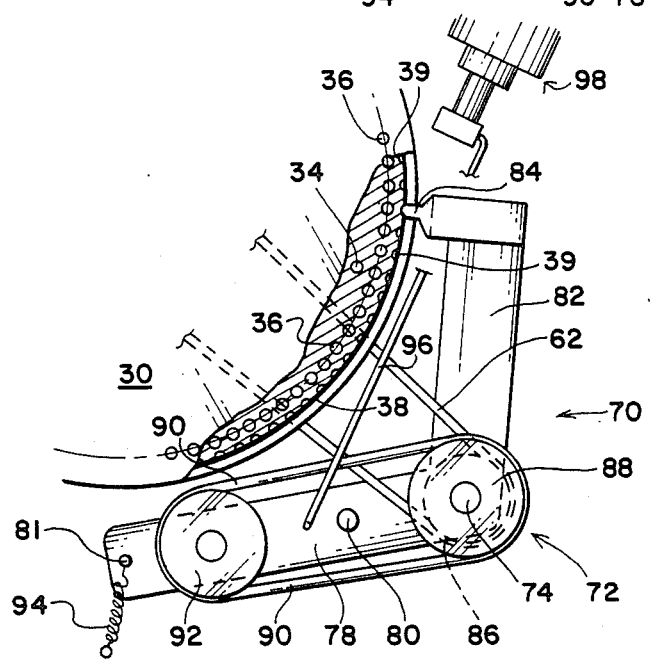
FIG. 4 is a cut-away top plan view of a preferred embodiment of the idler/brake/solenoid subassembly.
Figure 3:
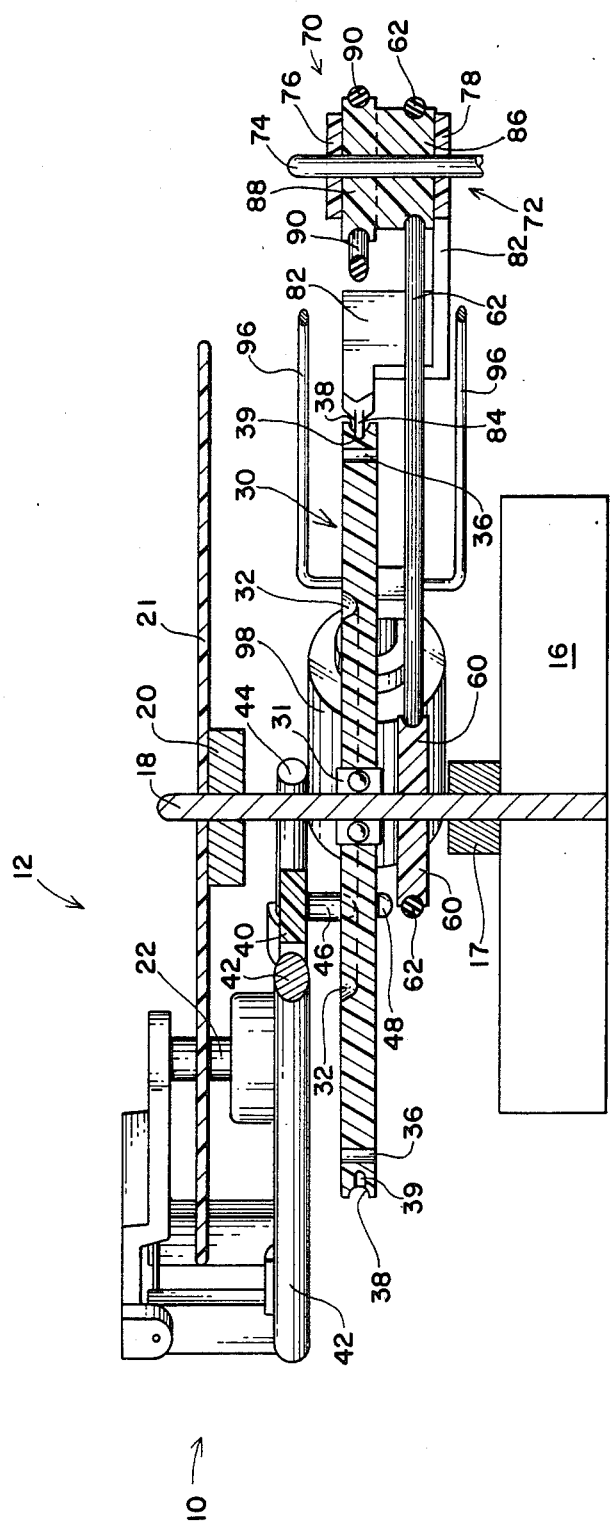
FIG. 3 is a cross sectional view taken along line 3—3 of FIG. 2, illustrating the vertical positioning of the various elements of the invention.
Figure 5:
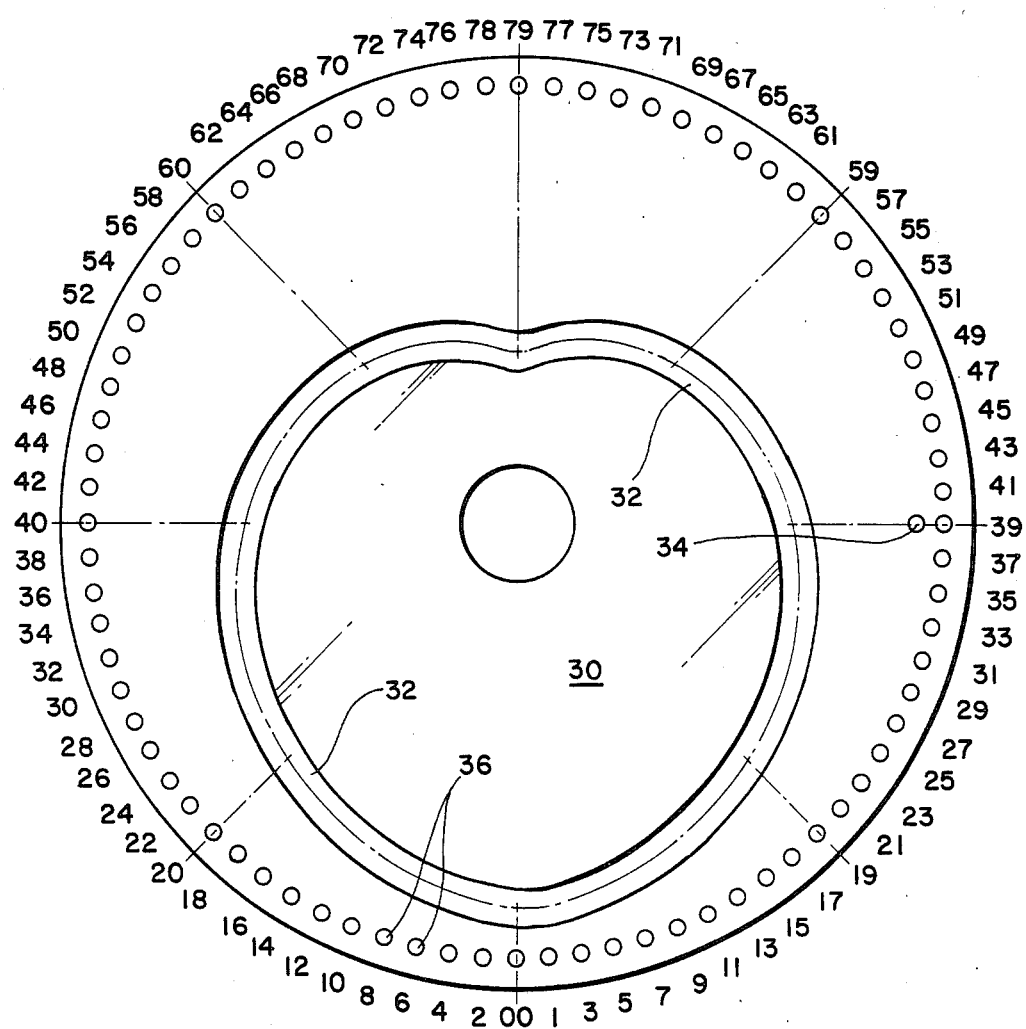
FIG. 5 is a partially schematic view of a preferred locating disk, illustrating the relationships of the various apertures and the cardioid cam groove.

The primary component of the locating disk subassembly is a locating disk 30, shown in best detail in FIGS. 2, 3 and 4 for physical characteristics and in a partially schematic fashion in FIG. 5. The locating disk 30 is in the nature of a rigid disk which is mounted concentrically with the drive shaft 18 by way of a mounting bearing 31. The mounting bearing 31 is provided such that even though the locating disk 30 is physically supported on the rotating drive shaft 18 the locating disk 30 does not rotate therewith. In the default mode of the assembly 10, until specifically activated into the drive mode, the locating disk 30 remains stationary with respect to an external reference point, even though the drive shaft 18 will be continuously rotating. The mounting bearing 31 is particularly illustrated in FIG. 3.

As is particularly shown in FIGS. 2 and 5, one surface of the locating disk 30 includes a cardioid cam groove 32 formed thereupon. In the preferred embodiment the cam groove 32 is formed on the upper surface of the locating disk 30, however this is not a critical determination. A cross section of the cam groove 32 may either be triangular, as shown in FIG. 3, or it may be semi-circular or another arc-like shape. The shaping of the cross section is determined by the nature of the element which is to track within the cam groove 32.

As is especially apparent in FIGS. 2 and 5, the shape of the cardioid groove 32 on the locating disk 30 is such that it approximately forms a stylized heart shaped when viewed from above. The cardioid cam groove 32 is continuous and surrounds the central axis (origin) of the locating disk 30.

In order to operate appropriately with the optical position sensing subassembly of the preferred embodiment, the locating disk 30 is provided with a series of apertures formed therethrough at positions near its perimeter. These apertures includes a single zero position aperture 34 and a series of track position apertures 36. The zero position aperture 34 and the track position apertures 36 are provided such that photoelectric sensing can be accomplished therethrough. Only one zero position aperture 34 is required while a track position aperture 36, each corresponding to a different radius of the cam groove 32, is provided for each read/write track to be provided on the diskette 21, or in an alternate embodiment, two apertures 36 are provided for each track, one on each side of a bisecting plane of the cam groove 32.

As is particularly shown in FIGS. 3 and 4, the locating disk 30 is also provided with a rim groove 38. The rim groove 38 is a continuous groove formed within the circumferential side portion of the locating disk 30 and extends entirely about the circumference. Within the rim groove 38 and opposite each track position aperture 36, is formed a plurality of brake detents 39, one for each aperture 36, especially shown in FIGS. 3 and 4. The brake detents 39 provide a means for maintaining the locating disk 30 in a fixed position during the default mode, when such is desired.

The subassembly for carrying the read/write head 22 includes a carriage member 40 which is slidably mounted on a first guide rod 42 and a second guide rod 44. In the preferred embodiment, the carriage 40 is shaped to be a predominantly right triangular member including two bushing or bearing mounts to allow it to slide smoothly on the first guide rod 42 and a single bushing or bearing mount allowing it to slide on the second guide rod 44. The first guide rod 42 and the second guide rod 44 are rigidly mounted on the case 14 and are parallel to each other. The effect of the mounting of the carriage 40 on the guide rods 42 and 44 is that the carriage 40 may only move in a linear orientation over a short segment. The read/write head 22 is mounted on the carriage 40 in such a manner that the line passing through the entire path traversed by the read/write head 22 intersects the axis of the drive shaft 18. Therefore, the motion of the read/write head 22 is entirely along a radius of the diskette 21, and only directly $+r$ and $-r$ motion is achieved. There is no $\phi$ component whatsoever to the motion of the read/write head 22.

In the preferred embodiment, the lower surface of the carriage 40 is provided with a cam follower 46 which is adapted to ride within the cardioid cam groove 32. A pressure arm 48, attached to the carriage 40, is adapted to apply vertical pressure to the lower surface of the locating disk 30 such that the cam follower 46 is maintained within the cardioid groove 32 and does not slip. This pressure also assures that the cam follower 46 will be situated in the center of the cam groove 32 at all times.

The positioning sensing subassembly, in the preferred embodiment, includes an optical sensing assembly 50 which is adapted to be mounted such that its elements overlap the locating disk 30 near the rim. The optical sensing assembly includes a zero position sensor 52 and a track counter sensor 54. The zero position sensor 52 and the track counter 54 are both photoelectric sensing devices which are adapted to be actuated when light is delivered through the zero position aperture 34 and the track position apertures 36, respectively. The sensors are connected to external control and operating circuitry, shown in FIG. 6, by a zero position electrical lead 56 and a track counter electric lead 58, respectively. The zero position sensor 52 will be actuated only when the zero position aperture 34 is aligned therewith while the track counter 54 will be actuated each time one of the track position apertures 36 is aligned therewith.

The rotational motion capture and delivery subassembly, shown especially in FIG. 3 and in phantom in FIG. 2, includes a main shaft pulley 60 which is rigidly and concentrically mounted upon the drive shaft 18 such that it rotates therewith. A main drive belt 62 provides a means of transferring a rotational motion of the main shaft pulley 60 to the idler/brake/solenoid subassembly.

The idler/brake/solenoid subassembly especially illustrated in FIG. 4, with reference to FIGS. 2 and 3, includes an idler mechanism assembly 70 which is adapted to receive the rotational motion generated on the main shaft pulley 60 and to selectively deliver it to rotate the location disk 30. The idler mechanism assembly 70 includes an idler carriage 72 which is pivotally mounted about a pivot pin 74 which is attached to the case 14. This idler carriage 72, the bottom portions of which are best illustrated in FIG. 4, includes an upper plate 76 (seen in FIGS. 2 and 3) and a lower plate 78 which are separated by a spacer post 80. The upper plate 76 and the lower plate 78 are parallel planar elements which are attached near one end to the pivot end 74 and near the other end to a terminal pin 81.

The upper plate 76 is rigidly attached to a brake plate 82 which is set at an angle to the upper plate 76 such that the brake plate 82 extends back toward the locating disk 30 from the pivot pin 74. Near the end of the brake plate 82 is provided a brake detent tip 84 (especially shown in FIGS. 3 and 4). The brake detent tip 84 is adapted to mate with the brake detents 39 on the locating disk 30 and, when engaged, prevent the locating disk 30 from rotating. In alternate embodiments, the brake detent tip 84 and the brake detents 39 may be replaced by a frictional braking element on the brake plate 82. The frictional braking element may be in the nature of a rubber or plastic pad which engages the edge of the locating disk 30 and prevents rotation. However, the use of the brake detent tip 84 in conjunction with the brake detents 39 is preferable since it absolutely causes the positioning of the locating disk to be such that precise location of a data track or cylinder is achieved.

Within the idler carriage 72 are mounted a main belt pulley 86 and an idler belt pulley 88, each of which rotates about the pivot pin 74. The main belt pulley 86 is situated below the idler belt pulley 88 and the two pulleys are slaved in a manner such that they rotate together, in the preferred embodiment by having them be integrally formed. The main drive belt 62 engages the main belt pulley 86 and causes it to rotate at all times when the drive shaft 18 is rotated. This causes consequent rotation of the idler belt pulley 88 which then drives an idler belt 90. The idler belt 90 extends from the idler belt pulley 88 to a terminal pulley 92 situated at the end of the idler carriage 72 near the terminal pin 81. As long as the main drive shaft 18 is rotating the idler belt 90 will also rotate.

A spring return 94, in the preferred embodiment in the form of a tension spring attached between the idler carriage 72 and the case 14, urges the tip of the idler carriage 72 away from the locating disk 30. In this manner, the idler belt 90 is prevented by the spring return 94 from engaging the locating disk 30 during the default mode.

The idler carriage 72 is also connected to a linkage 96 which leads from the idler carriage 72 to a solenoid 98, mounted to the frame 14. The rigid linkage is situated such that when the solenoid 98 is activated the linkage 96 pulls the idler carriage 72 towards the solenoid 98 and the causes the idler belt 90 to engage the rim groove 38 of the locating disk 30. A more thorough discussion of the operation of the head positioning assembly 10 is set forth below under "Industrial Applicability".

FIG. 5 illustrates, in a partially schematic fashion, a typical variety of locating disk 30 which might be utilized with the present invention. Although the discussion above and below deals with a locating disk having 60 track positioning apertures 36 the embodiment illustrated in FIG. 5 is designed to have 80 track position apertures 36. The disk illustrated is thus adaptable for use with a floppy disk 21 which is formatted to have 80 tracks on its surface.

Each of the track position apertures 36 corresponds to one of the data tracks on the diskette 21. Each of the apertures also corresponds to a specific radius between the origin of the locating disk 30 and the center of the cam groove 32.

Numerals have been placed about the outside of the locating disk 30 in the drawing of FIG. 5 to designate the radii of the locating disk 30 which correspond to the tracks on the floppy diskette 21. For example, the radius designated as 00 (r00) in the drawing has the maximum radial segment from the origin to the center of the cam groove 32 whereas the radius designated as 79 (r79) in FIG. 5 has the minimum radial separation between the cam groove 32 and the origin. It is to be particularly noted that the numerals stated in FIG. 5 correspond to the radii and not to the track position apertures 36. Due to the fact that the sensing apparatus is offset approximately 90° from the position of the cam follower 46 the track position apertures 36 are numbered in such a manner to reflect this offset, since the actual positioning of the head is dependent on the cam follower 46 position.

It may therefore be seen that when radius 00 (r00) is in contact with the cam follower 46 then the zero position aperture 34 will be aligned with the zero position sensor 52, at least as the construction of the preferred embodiment is presently envisioned. In that case, the track position aperture 36 which is shown in the drawing as being aligned with radius number 39 (r39) actually corresponds to track 00 on the floppy diskette 21.

For the array of apertures and radii shown in FIG. 5 a maximum r value, corresponding to track 00, has a r00=3.903 centimeter (1.555 in.). The separation of the tracks in terms of r values [r(n)−r(n−1)] is 0.0182 cm (0.0073 in.) between consecutively numbered tracks. Therefore, the minimum radius value, corresponding to track 79, is r79=2.435 cm (0.970 in.).

It is noted that the radii are numbered in such a manner that the positions corresponding to the odd numbered tracks fall on one side of the cam groove 32 whereas the positions corresponding to the even numbered tracks fall on the opposite side. This is a matter of choice and is selected such that the track positioning apertures 36 may be separated sufficiently for accurate and ready sensing. This also means that the cardioid cam groove 32 is not truly symmetrical. If the cam groove were symmetrical then it would not be possible to have the track positioning apertures 36 separated by equal amounts. As it is, each of the apertures 36 is separated by $\phi = 4.5°$ of rotation.

As discussed below it is possible to construct the locating disk 30 with varying numbers of apertures and any selected range of values for the radii shown in FIG. 5. The illustration of FIG. 5 is to merely establish one set of values which is operable with the invention.

Figure 6:
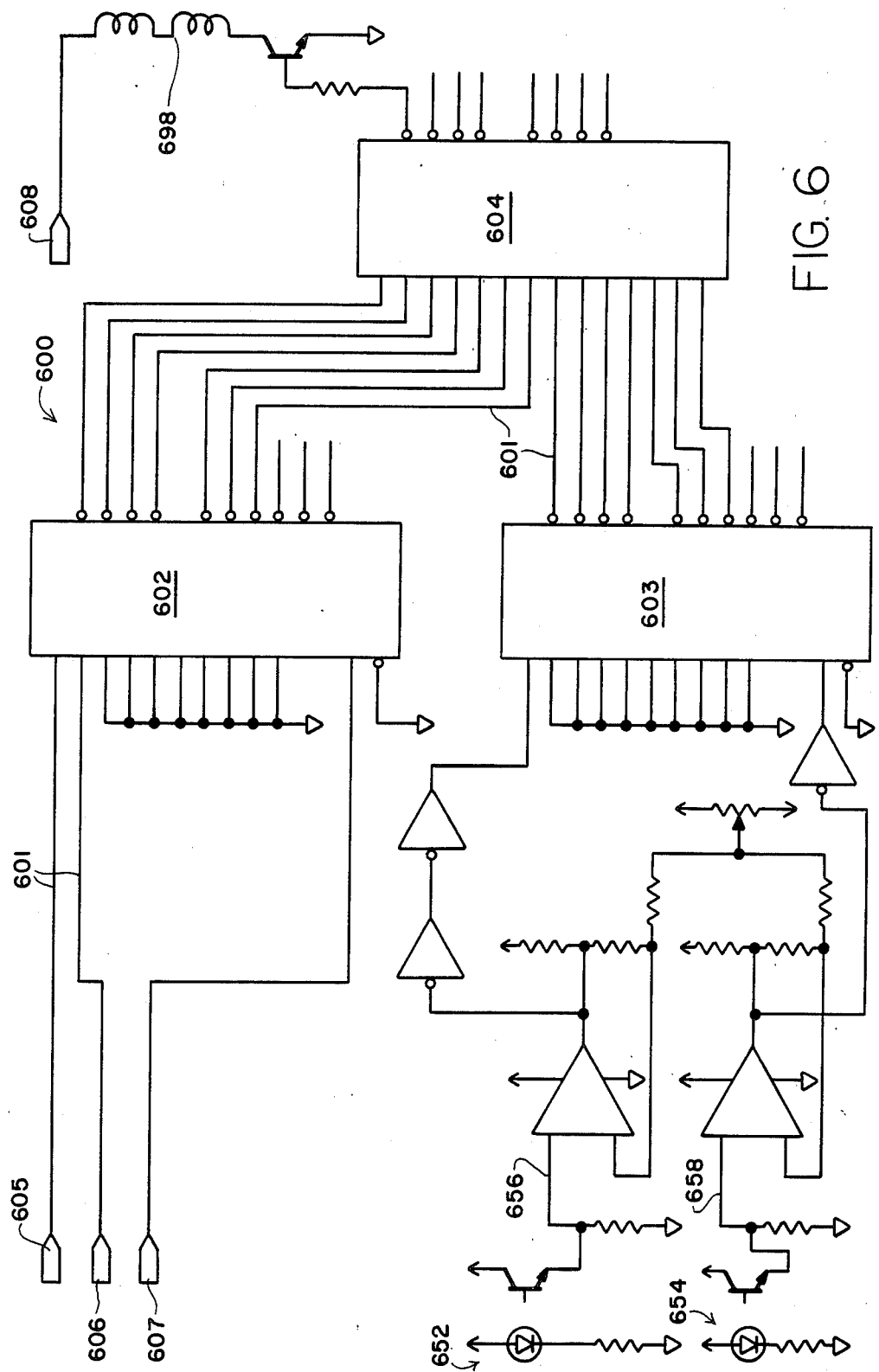
FIG. 6 is a schematic diagram of the associated external circuitry of a type typical of that utilized with the invention.

Although the mechanical elements of the head positioning assembly are shown in FIGS. 1-5, it is also necessary to utilize electrical control and measuring circuitry for proper operation of the device. A schematic diagram of one typical embodiment of the associated circuitry is illustrated in FIG. 6. The external circuitry elements of the device 10 connect to the mechanical elements at the optical subassembly 50 and the solenoid 98.

In the embodiment of external circuitry illustrated in a schematic manner in FIG. 6, the portions of the external circuitry 600 which affect the operation of the locational elements of the device 10 are shown. To a certain degree, the elements illustrated correspond to physical elements shown in the other figures. For example, the elements shown in the lower left portion of FIG. 6 and designated as 652, 654, 656, and 658 are electrical schema which respectively correspond to the zero position sensor 52, the track position sensor 54, the zero position electrical lead 56 and the track counter electrical lead 58. Similarly, the electrical element illustrated in the upper right hand portion of FIG. 6 and designated as 698 is an electrical schema corresponding to the physical solenoid 98 shown in the other figures.

Since the actual operation of the circuitry is merely a matter of choice and since numerous modifications and alternate methods of accomplishing the same purposes may be obtained, the various elements of FIG. 6 will be discribed in general nature only. It may be seen that the circuitry 600 includes a plurality of electrical conducting elements 601 which serve the purpose of leads. Each of the conductors 601 delivers electrical impulses from one element to another within the circuitry 600. The external circuitry 600 includes three integrated circuit chips which are designated as a first chip 602, a second chip 603 and a third chip 604. Each of these chips represents a complex combination of circuitry which is custom designed for a given particular purpose. In this instance, the first chip 602 is referred to as a "counter A" chip, the second chip 603 is referred to as a "counter B chip" and the third chip 604 is referred to as an "exor and" chip.

The external circuitry receives input from the counter elements 652 and 654 and additionally from the software controlling the disk drive and from other external control circuitry. Additional inputs include a power reset input 605, a directional selection input 606 and a step input 607. Furthermore, a solenoid power supply 608 is connected in order to enable the solenoid 698 to operate properly.

For the external solenoid control circuitry 600, the nature of operation is as follows. When the power reset input 605 is activated, ordinarily by the power on for the disk drive unit or by a software signal, the first chip 602 is reset to zero and the solenoid 698 is activated until it is caused to deactivate by the actuation of the zero position sensor 652 which will occur when the zero position aperture 34 is situated opposite the zero position sensor 52. The circuitry 600 is adapted to cause the solenoid 698 to be activated whenever the value of counter A, chip 602, is not equal to the value of counter B, chip 603. When these values are not equal then counter B, chip 603, will begin to start counting the inputs from the track position sensor 654 and will count the number of apertures 36 which pass the counter 654 until parity is achieved.

When it is desired to move the diskette to a different track, then a step input signal is delivered at 607 and the first chip 602 is incrementally increased to a new count value. This count value will be unequal to that of the second chip 603 so the solenoid will be activated. The second chip 603 will then permit an incremental number of track sensing apertures 36 to pass the track position sensor 54 until the count value of chip 603 is equal to the count value of chip 602. At this point the appropriate track number should be aligned with the read-write head 22 and the solenoid 698 will be de-activated. The function of the third chip 604 is to activate the solenoid 698 whenever the count signals received from the first chip 602 and the second chip 603 do not match up. The solenoid power source input 608 is a steady voltage which is merely necessary to induce the physical motion in the solenoid when it is activated by the third chip 604. In the preferred embodiment the power input 608 is a constant +12 volts.

In order to minimize weight and cost of manufacture, most of the elements of the head positioning assembly 10 of the preferred embodiment are constructed of molded plastics. The preferred material is polycarbonate glass filled plastic. Exceptions are the guide rods 42 and 44, the cam follower 46, the spring return 94 and the linkage 96, all of which are typically metallic. Of course, the solenoid 98 must be a ferromagnetic material for proper operation.

The locating disk 30 is constructed of a rigid plastic material premolded into the shape shown, especially in FIG. 5. The zero position aperture 34 and the track position apertures 36 are selected to have a diameter of 0.78 cm (0.029 in.) and the preferred locating disk 30 itself has a diameter of 6.28 cm (2.5 in.). The radial positioning of the cardioid cam groove 32 is as shown in FIG. 5. The cam groove 32 does not correspond to any known mathematical equation.

In the preferred embodiment the main shaft pulley is selected to have an operative diameter of 1.89 cm (0.75 in.) and is utilized to have a main drive belt 62 having a diameter of 0.157 cm (0.0625 in.). The main belt pulley has a diameter of 0.941 cm (0.375 in.) and the idler belt pulley has a diameter of 1.26 cm (0.5 in.). In this manner the ratio from the main shaft pulley 60 to the main belt pulley 86 to the idler belt pulley 88 is 2 to 1 to 1.33. Thus, for a typical drive shaft 18 rotational velocity of 300 rpm (5 rps), the idler belt pulley 88 will rotate at 600 rpm (10 rps) and the idler belt 90 advances at a rate of 39.4 cm/sec (15.7 in./sec). When the idler belt 90 engages the locating disk 30 it thus causes the locating disk 30 to rotate at a rotational velocity of 120 rpm (2 rps) with a linear velocity at its rim of 39.4 cm/sec (15.7 in./sec). In this manner, a change of position from two adjacent track positions on the locating disk 30 will consume approximately 6.25 ms (0.00625 sec) while a complete rotation of the locating disk 30 requires 0.5 seconds.

The entire disk drive assembly 12 is adapted to have a width of 10.0 cm (4 in.), a height of 4.08 cm (1.625 in.)

and a depth of 15.1 cm (6 in.) in order to fit into the standard disk drive compartments within personal computers and the like.

The inventor also visualizes numerous alternate embodiments of the invention which are adapted for specific purposes or utilize alternate methods of accomplishing some of the interactive processes of the present invention. One area wherein an alternate method may be utilized is in the sensing assembly 50. Although the preferred embodiment utilizes the optical zero position sensor 52 and track counter 54 for sensing the zero position aperture 34 and the track position apertures 36, various other position sensing assemblies may be utilized. One possible alternative sensing mechanism would utilize a mylar template mounted about the circumference of the locating disk 30 such that position marks are made on the template which correspond to the location of the tracks. These optical position marks would serve the same purpose as the apertures and could be optically read in a similar manner. Along the same lines, a magnetically encoded template may be created on the locating disk such that the position could be magnetically, rather than optically sensed. A mechanical method such as sensing of physical notches in the top of the locating disk 30 might also be utilized.

Another area in which an alternate embodiment might be utilized is in the correlation between the apertures and the tracks upon the diskette 21. As is shown in FIG. 5, the preferred embodiment utilizes adjacent track position apertures 36 on the locating disk to correspond to alternate tracks on the diskette 21. In the preferred embodiment tracks 1, 3, 5 etc. are accessed consecutively going along one side of the cardioid cam groove 32 while the even numbered tracks (0, 2, 4, etc.) are accessed on the other side of the track. In this manner, the transition from track 0 to track 1 involves a complete rotation of the locating disk 30, minus one position. In an alternate embodiment, it would be possible to double (minus two) the number of track position apertures such that each consecutive track could be accessed by a rotation corresponding to a single aperture. If this alternative is utilized, then tracks 0 to 79, for example, would be accessed by a traverse of one side of the cardioid cam groove 32 ( a rotation of 180° of the locating disk 30) while the return trip along the other side of the cardioid cam groove 32 (the remaining 180° of rotation) would access track 79 to 0 in reverse order. Thus, a total of 158 tracks would be required, the terminal tracks 00 and 79 requiring only one aperture 36 while each other track would have an analog aperture 36 on each side of the cam 32. This mirror image tracking, although requiring greater sensitivity in the sensing and locating mechanisms, could increase the speed of transition from one track to another.

Another area in which an alternative embodiment could be incorporated is in the braking mechanisms. Although the preferred embodiment, utilizing the brake detents 39 and the brake detent pin 84, is desirable since it absolutely establishes positioning, other methods such as a frictional brake may be entirely adequate for the purpose. The preferred method of tying the brake mechanism to the rotation of the idler/brake/solenoid subassembly permits greater simplicity and minimization of moving parts but the same result could be accomplished, for example, by utilizing a hydraulically or spring actuated disk brake situated concentrically with the drive shaft 18, or by a dual bearing mechanism on the drive shaft 18 or mounting bearing 31 to preload rotational resistance to the locating disk 30.

Similarly, an alternate method of selectively spinning the locating disk 30 could be incorporated. One such method is to utilize a selectively actuated wheel mechanism which would abut against the lower surface of the locating disk 30 and, when actuated, cause the disk to rotate. Another possible alternative locating disk 30 spinning mechanism might use a clutched gear mechanism. Hydraulic, rather than solenoid type engagement mechanisms may also be utilized.

It is noted that construction of the mechanism is simplified by attaching the spring return 94 at the exterior tip of the idler carriage 72. However, other urging means located, for example, at the exterior tip of the brake plate 82 would also be effective. Another possibility would be to place a rotational spring about the pivot pin 74 which urges the brake detent tip into engagement position (default mode). Any arrangement which, in non-actuated mode, causes the locating disk to be held in the default mode of a non-rotating position but allows such urging to be overcome selectively to a drive mode, will be acceptable.

The brushless DC motor may also be replaced by any type of device which produces constant speed rotation.

Those skilled in the art will readily observe the numerous modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The present invention is adapted for utilization with rotating mechanisms wherein it is desirable to precisely locate a radial point on the rotating device. The predominant expected usage of the preferred embodiment is in conjunction with floppy and fixed disk drive adapted for usage in storage and retrival of data on magnetic media. The immediate usage of the preferred embodiment illustrated is in a micro floppy disk drive for diskettes having an 8.79 cm (3.5 in.) diameter.

The method of operation of the preferred embodiment is as follows. When a diskette is inserted into the drive 12, the assembly 10 will invoke a "power-on reset" which will cause the locating disk 30 to rotate in such a manner that a read/write head 22 is situated on track 00 of the diskette. In this position, the zero position aperture 34 will be situated in conjunction with the zero position sensor 52 and the cam follower 46 will be at its maximal radial separation [r(max)] from the origin of the locating disk 30. The diskette 21 will be caused to continually rotate during operation by the motion of the brushless DC motor 16 causing the drive shaft 18, the hub 20 and consequently the diskette 21 to rotate at a constant speed. During such rotation, with the radial position of the read/write head 22 stationary, the read/write head 22 will, in one rotation of the diskette 21, read all of the data on the selected track.

When it is desired to change the track being read or written to, a signal is delivered to the external control 600 circuitry which causes the head positioning assembly 10 to be actuated. If for example, it is desired to read data contained on track 4, then, under the preferred embodiment, the locating disk 30 will be caused to rotate such that the second track position aperture situated counterclockwise to the original position will now be situated in conjunction with the track sensor 54. It is noted that the direction of rotation is opposite to that of the diskette 21 in the preferred embodiment. The track sensor 54 will count the track position apertures 36 passing through the conjunction point and will, in association with the external circuitry 600, sense the onset of the appropriate aperture 36.

The motion of the locating disk is accomplished as follows. In the default mode of the assembly 10, the brake detent pin 84 will be in engagement with a brake detent 39, thus preventing rotation of the locating disk 30. In this default mode, the idler belt 90 will be in motion about the idler belt pulley 88 and the terminal pulley 92 but will not be an engagement with the rim groove 38 of the locating disk 30. The action of the spring return 94 prevents this in the default mode. However, when the appropriate signal is received, the solenoid 98 is actuated and the linkage 96 is urged into the solenoid 98 such that the force of the spring return 94 is overcome, the brake detent pin 84 is caused to disengage from the detent 39 and the idler belt 90 is brought into abutment against the rim groove 38 of the locating disk 30. When this occurs, the idler belt 90 imparts rotational force in a frictional manner to the locating disk 30. This rotational force will continue to be delivered as long as the solenoid 98 is actuated.

When the track position sensor 54 sends the appropriate signal to the external circuitry 600 that the destination track position has been reached, then the solenoid 98 will be deactuated and the force of the linkage 96 will be removed. At this point, the force of the spring return 94 will again be paramount and the idler belt 90 will be pulled away from the rim track 38. At this point, no further rotational impetus will be provided to the locating disk 30. Concurrently, the action of the spring return 94 will cause the brake plate 82 to be urged toward the locating disk 30 such that the brake detent pin 84 will be urged into engagement with the opposing brake detent 39. This will arrest the motion of the locating disk 30 and hold it in a fixed position until further rotation is actuated.

The result of the rotation of the locating disk 30 upon the head carriage assembly 40 and consequently upon the read/write head 22 is as follows. The various track position apertures 36 correspond to specific radial position changes, in a quantum manner, on the diskette 21. The shaping of the cardioid cam groove 32, as shown in FIG. 5, is such that the radius from the origin of the locating disk to a given position on the cardioid groove 32 differs in a continuous manner during a traverse of the cardioid cam groove 32. The positions of the track position apertures 36 are selected such that a rotation of the locating disk 30 from one track position aperture to the next adjacent track position aperture 36 corresponds to a radial distance change equal to the radial distance between alternate tracks on the diskette 21.

Since the cam follower 46 is carried within the cardioid cam groove 32, the radial distance from the cam follower 46 to the central axis of the drive shaft 18 will be altered correspondingly. The slidable mounting of the carriage 40 on the first guide rod 42 and the second guide rod 44 only permits the carriage 40, and consequently the read/write head 22, to traverse a linear +r and −r segment as a path. Therefore, the radial position of the read/write head 22 will be altered by precisely the same increment as the position of the cam follower 46.

In the example selected, a movement from track 00 to track 4 on the diskette 21, the cam follower 46 will be initially situated at the tip of the cardioid cam groove 32. This is the position where the center of the cam groove 32 is at its greatest radial distance [r(max)] from the central axis of the drive shaft 18. The actuation of the solenoid 98 will then cause the locating disk 30 to be rotated such that the second track position 36 from the original position will be aligned with the track counter sensor 54 and then the solenoid 98 will be deactuated. At the point of deactuation and arresting of movement of the locating disk 30, the cam follower 46 will be displaced from its original position by slight degree ($\phi=9°$) and will be at a position where its radial distance from the central axis is less than at its track 00 position. With a locating disk such as that shown in FIG. 5, the total difference in displacement will be 0.0733 cm (0.0292 in.). If, on the other hand, it is desirable to travel from track 00 to track 1, then a nearly complete rotation of the locating disk 30 will occur.

The selection of the number of track position apertures 36 traversed through the track counter sensor 54 will be determined by the external circuitry 600 illustrated in FIG. 6 and the actuation and deactuation of the solenoid 98 will be accordingly accomplished. The above description is applicable to the preferred embodiment wherein the rotation of the locating disk 30 is accomplished only in a single continual rotational direction and the alternate track assignment of track position apertures 36 is selected. For alternate embodiments the process will be similar, depending upon the track position assignments and the availability of reverse rotation.

The head positioning assembly 10 of the present invention has numerous characteristics which provide it with substantial beneficial results. These include the fact that it may be readily constructed from inexpensive and light materials, that it eliminates a necessity for a separate motor for positioning the head, that it is compact and may be enclosed within the conventional disk drive assembly case 14 and that it causes the position of the read/write head 22 to be locked on a given track during the period that the reading of such track is being accomplished. All of these represent substantial advantages in the marketplace. It is therefore expected that the present invention will have extremely widespread industrial utility and commercial viability.

I claim:

1. A positioning assembly for positioning a point element on a rotating member, comprising:
    a carriage member mounted such that it is permitted to move only along a radial segment with respect to the rotating member, the carriage supporting the point element to be positioned and further including a cam follower;
    a locating disk having a cam groove formed on the surface thereof, with the groove forming a closed path about the origin of the locating disk and having varying radial separation therefrom, such that said cam follower rides within said cam groove in a manner such that the carriage is caused to move as the locating disk is rotated; and
    means for selectively causing said locating disk to rotate in a predetermined manner.

2. The assembly of claim 1 wherein:
    the locating disk is concentrically mounted on the drive shaft of the rotating member but does not rotate therewith.

3. The assembly of claim 2 wherein:

said carriage member is slidably mounted on two or more parellel rails;
said cam groove is generally cardioid shaped; and
the means for selectively causing rotation includes a first pulley means for rotating concurrently with the rotating member, pivoting rotational assembly means, said pivoting rotational means having at least two pivot positions, said pivot positions being a disengaged mode where there is no contact between said pivoting assembly means and the locating disk and a drive mode where a rotating portion of said pivoting assembly engages the locating disk and causes the locating disk to rotate thereby, transfer means for delivering rotational motion from said first pulley means to said pivoting assembly, and mode actuating means for urging said pivoting assembly either into said disengaged mode or said drive mode.

4. The assembly of claim 3 wherein said mode actuating means includes:
default urging means for continually urging said pivoting assembly into said disengaged mode;
actuatable pivot means for overcoming said default urging means and thereby forcing said pivoting assembly into said drive mode; and
control means for activating said actuatable pivot means.

5. The assembly of claim 4 wherein said actuatable pivot means includes:
a solenoid; and
linkage connecting said solenoid to said pivoting assembly.

6. The assembly of claim 5 wherein:
said default urging means is in the form of a compression spring fixed at one end and connected at its other end to said pivoting assembly; and
said pivoting assembly includes an idler arm including an idler belt pulley, a terminal pulley and an idler belt mounted on said pulleys with said belt being caused to rotate about said pulleys by said transfer means, a brake arm, rigidly connected to said idler arm and displaced therefrom, for arresting the motion of the locating disk, and a pivot pin located near the connection point of said idler arm and said brake arm.

7. The assembly of claim 1 wherein:
said cam groove is generally cardioid shaped.

8. The assembly of claim 1 wherein:
said carriage member is slidably mounted on two or more parallel rails.

9. The assembly of claim 1 wherein the means for selectively causing rotation includes:
a first pulley means for rotating concurrently with the rotating member;
pivoting rotational assembly means, said pivoting rotational means having at least two pivot positions, said pivot positions being a disengaged mode where there is no contact between said pivoting assembly and the locating disk and a drive mode where a rotating portion of said pivoting assembly engages the locating disk and causes the locating disk to rotate thereby;
transfer means for delivering rotational motion from said first pulley means to said pivoting assembly; and
mode actuating means for urging said pivoting assembly either into said disengaged mode or said drive mode.

10. The assembly of claim 9 wherein said mode actuating means includes:
default urging means for continually urging said pivoting assembly into said disengaged mode;
actuatable pivot means for overcoming said default urging means and thereby forcing said pivoting assembly into said drive mode; and
control means for activating said actuatable pivot means.

11. The assembly of claim 10 wherein said actuatable pivot means includes:
a solenoid; and
linkage connecting said solenoid to said pivoting assembly.

12. The assembly of claim 10 wherein:
said default urging means is in the form of a compression spring fixed at one end and connected at its other end to said pivoting assembly.

13. The assembly of claim 9 wherein said pivoting assembly includes:
an idler arm including an idler belt pulley, a terminal pulley and an idler belt mounted on said pulleys with said belt being caused to rotate on said pulleys by said transfer means;
a brake arm, rigidly connected to said idler arm and displaced therefrom, for arresting the motion of the locating disk; and
a pivot pin located near the connection point of said idler arm and said brake arm.

14. The assembly of claim 1 wherein:
the locating disk is provided with a plurality of marker elements distributed rotationally thereon such that each said marker element corresponds to a specific radial displacement between a corresponding point within said cam groove and the origin of the locating disk; and
the assembly further includes sensing means for sensing the position of said marker elements and thereby creating analogous electrical signals; and
analog signal transfer means for carrying said electrical signals from said sensing means to the means for selectively actuating rotation.

15. The assembly of claim 14 wherein:
said marker elements are apertures formed through the locating disk near the perimeter thereof; and
said sensing means are photoelectric.

16. The assembly of claim 14 wherein:
said cam groove is generally cardioid shaped.

17. The assembly of claim 14 wherein:
said carriage member is slidably mounted on two or more parallel rails;
said cam groove is generally cardioid shaped; and
the means for selectively causing rotation includes a first pulley means for rotating concurrently with the rotating member, pivoting rotational assembly means, said pivoting rotational means having at least two pivot positions, said pivot positions being a disengaged mode where there is no contact between said pivoting assembly means and the locating disk and a drive mode where a rotating portion of said pivoting assembly engages the locating disk and causes the locating disk to rotate thereby, transfer means for delivering rotational motion from said first pulley means to said pivoting assembly, and mode actuating means for urging said pivoting assembly either into said disengaged mode or said drive mode.

18. The assembly of claim 14 wherein said means for selectively causing rotation includes:
the means for selectively causing rotation include a first pulley means for rotating concurrently with the rotating member, pivoting rotational assembly means, said pivoting rotational means having at least two pivot positions, said pivot positions being a disengaged mode where there is no contact between said pivoting assembly means and the locating disk and a drive mode where a rotating portion of said pivoting assembly engages the locating disk and causes the locating disk to rotate thereby, transfer means for delivering rotational motion from said first pulley means to said pivoting assembly, and mode actuating means for urging said pivoting assembly either into said disengaged mode or said drive mode.

19. A point positioning assembly for radially positioning a point element on a rotating disk having a plurality of concentric circular radially separated tracks formed thereon, comprising:
a locating disk mounted concentrically with the central axis of the rotating disk, the locating disk including
a continuous cam groove formed on the surface thereof, with the varying radial separation (r) between the center of said cam groove and said central axis,
a plurality of track markers placed on the locating disk such that each track marker corresponds to a r position on said cam groove, and
each r corresponding to a track marker is analogous to a track on the rotating disk; a carriage assembly, restricted such that its motion is limited to be within a plane perpendicular to the plane of the rotating disk and containing a selected radius thereof, the carriage assembly including,
the point element to be positioned and a cam follower for riding within said cam groove such that rotation of the locating disk causes the radial position of the cam follower, and concurrently the carriage assembly, to vary; sensing means for sensing said track markers; and
control means for selectively causing the rotation of the locating disk to selected r positions.

20. The assembly of claim 19 wherein:
said cam groove is assymmetrical about any radial plane of the locating disk but is generally cardioid shaped.

21. The assembly of claim 20 wherein:
the outermost and innermost tracks on the rotating disk each have a single corresponding track marker and each other track has a pair of corresponding track markers, the markers in each pair being situated such that a rotation of the locating disk from sensing one marker or each said pair to the other member causes either the outermost corresponding marker or the innermost corresponding marker to pass a conjunction point with the sensing means.

22. The assembly of claim 20 wherein:
the angular displacement of said track markers from each adjacent track marker remains constant about the locating disk.

23. The assembly of claim 19 wherein:
at least one of said track markers corresponds to each concentric track on the rotating disk such that when the sensing means are aligned with said corresponding track marker the point element is positioned upon the corresponding track.

24. The assembly of claim 19 wherein:
exactly one of said track markers corresponds to each track and said track markers corresponding to the even numbered tracks reflect r positions along one side of said cam groove while said track markers corresponding to odd numbered tracks reflect r positions on the opposite side of said cam groove.

25. The assembly of claim 19 wherein:
said track markers are in the nature of apertures formed through the locating disk near the perimeter thereof; and
the sensing means includes a photoelectric element for sensing the passage of light through said apertures.

26. The assembly of claim 25 wherein:
said track markers include a single registration marker, radially displaced from the remainder of said track markers; and
the sensing means includes an additional photoelectric element for sensing said registration marker.

27. The assembly of claim 19 wherein:
the carriage assembly further includes pressure means to continually urge said cam follower into the exact center of said cam groove.

28. The assembly of claim 19 wherein the carriage assembly further includes:
a carriage plate upon which the remaining elements are carries;
a first guide rod rigidly mounted such that said carriage plate slidably moves thereon; and
a second guide rod, rigidly mounted to be parallel to said first guide rod, such that said carriage plate slidably moves thereon.

29. The assembly of claim 28 wherein:
the carriage assembly further includes pressure means to continually urge said cam follower into the exact center of said cam groove.

30. The assembly of claim 19 wherein the control means includes:
electrical leads adapted to carry signals generated by the sensing means to electrical control circuitry, said circuitry being adapted to process said signals and determine thereby the position of the locating disk and further adapted to receive input from external apparatus regarding the desired position of the point element and to generate control signals to locating disk rotational positioning means such that said positioning means cause the locating disk to rotate until the point element reaches its desired position.

31. The assembly of claim 30 wherein said locating disk rotational positioning means includes:
a continually moving element situated in an idler subassembly, said idler subassembly being locatable in at least two distinct positions, said distinct positions being a disengaged mode where there is no contact between said continually moving element and the locating disk and a drive mode where said continually moving element engages the locating disk and causes it to rotate; and
mode switching means for causing said idler subassembly to be situated in either said disengaged mode or said drive mode.

32. The assembly of claim 31 wherein said idler subassembly includes:

an idler arm including an idler belt pulley, a terminal pulley and an idler belt threaded on said pulleys, said idler belt constituting the portion of said continually moving element which engages the locating disk, said idler arm being positioned such that said idler belt lies in the same plane as the locating disk;

a brake arm, including a brake element for abutting against the locating disk during said disengaged mode and preventing rotation thereof, said brake arm being rigidly attached to one end of said idler arm and further being angularly offset therefrom; and a pivot element upon which the idler arm and brake arm are pivotally mounted.

33. The assembly of claim 32 wherein said mode switching means includes:

default urging means continually urging said idler subassembly into said disengaged mode;

a solenoid adapted to be activated by said control signals; and linkage connecting said solenoid to said idler subassembly such that when said solenoid is activated the force of said default urging means is overcome and said idler subassembly is urged into said drive mode.

34. The assembly of claim 32 wherein:
said brake element includes a narrow tip; and
the locating disk is provided with a plurality of brake detents on its circumferential surface for mating with said narrow tip during said disengaged mode and maintaining said locating disk in a stationary position.

35. The assembly of claim 31 wherein:

said idler subassembly is continually urged into said disengaged mode; and said mode switching means includes force providing means for overcoming said urging.

36. A head positioning assembly for a disk drive comprising:

a carriage for carrying a read/write head, the carriage further including a cam follower, the carriage being restricted in its degree of freedom of movement such that said read/write head traverses only a segment of a radius of the disk;

a locating disk including a continuous cam groove formed thereon for receiving said cam follower, said cam groove having varying radial separation from the origin of the locating disk depending upon the angular position of the selected radius, the locating disk further including a plurality of track markers, each said track marker corresponding to an incremental radial position of said cam groove;

sensing means for sensing said track markers and generating thereby analog signals;

control and processing means for receiving said analog signals and external inputs and generating thereby selected control signals; and a bipositional idler assembly including motive means and being positionable either in a drive mode, wherein said motive means provide rotational motion to the locating disk, or a disengaged mode wherein the idler subassembly prevents the locating disk from rotating, and further including means for receiving said selected control signals and selectively switching the idler subassembly between said drive mode and said disengaged mode.

* * * * *